(12) United States Patent
Zhang

(10) Patent No.: US 11,290,573 B2
(45) Date of Patent: Mar. 29, 2022

(54) METHOD AND APPARATUS FOR SYNCHRONIZING VIEWING ANGLES IN VIRTUAL REALITY LIVE STREAMING

(71) Applicant: Alibaba Group Holding Limited, Grand Cayman (KY)

(72) Inventor: Zhe Zhang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/965,734

(22) PCT Filed: Feb. 2, 2019

(86) PCT No.: PCT/CN2019/074529
§ 371 (c)(1),
(2) Date: Jul. 29, 2020

(87) PCT Pub. No.: WO2019/158000
PCT Pub. Date: Aug. 22, 2019

(65) Prior Publication Data
US 2021/0037116 A1  Feb. 4, 2021

(30) Foreign Application Priority Data
Feb. 14, 2018  (CN) .......................... 201810151922.0

(51) Int. Cl.
*H04L 29/06* (2006.01)
*H04L 67/131* (2022.01)
(Continued)

(52) U.S. Cl.
CPC .............. *H04L 67/38* (2013.01); *G06T 11/00* (2013.01); *H04L 65/4092* (2013.01); *H04L 65/80* (2013.01)

(58) Field of Classification Search
CPC ..... H04L 67/38; H04L 65/4092; H04L 65/80; G06T 11/00; H04N 13/00; H04N 21/442;
(Continued)

(56) References Cited

U.S. PATENT DOCUMENTS 7,796,162 B2   9/2010  Ortiz
8,803,916 B1   8/2014  Paczkowski et al.
(Continued)

FOREIGN PATENT DOCUMENTS

CN     105704468 A    6/2016
CN     106125930 A    11/2016
(Continued)

OTHER PUBLICATIONS

Office Action received in corresponding CN Application No. 20181051922.0 dated May 10, 2021 (11 pages).
(Continued)

*Primary Examiner* — Oanh Duong
(74) *Attorney, Agent, or Firm* — James J. DeCarlo; Greenberg Traurig, LLP

(57) ABSTRACT

Embodiments of the disclosure provides a method and an apparatus for synchronizing viewing angles in Virtual Reality (VR) live streaming. The method comprises: determining transmitting user's viewing angle information corresponding to image frames in a process of playing VR content on a transmitting device side; and providing the image frames in the VR content and the transmitting user's viewing angle information corresponding to the image frames to a VR receiving device such that, when displaying the VR content, the VR receiving device is configured to determine, based on the transmitting user's viewing angle information corresponding to a current image frame to be displayed and a
(Continued)

preset number of preceding image frames, a display angle for the VR receiving device to display the current image frame to be displayed.

15 Claims, 9 Drawing Sheets

(51) Int. Cl.
*G06T 11/00* (2006.01)
*H04L 65/613* (2022.01)
*H04L 65/80* (2022.01)

(58) Field of Classification Search
CPC ............ H04N 13/366; H04N 21/4402; H04N 13/398; H04N 21/45; H04N 21/43; H04N 21/2187; H04N 21/234; H04N 21/472; H04N 21/218; H04N 21/4302; H04N 21/44213; H04N 21/4508
See application file for complete search history.

(56) References Cited

U.S. PATENT DOCUMENTS

| | | | |
|---|---|---|---|
| 9,143,729 B2 | 9/2015 | Anand et al. | |
| 9,298,283 B1* | 3/2016 | Lin ..................... | G06F 3/147 |
| 9,516,225 B2 | 12/2016 | Banta et al. | |
| 9,804,257 B2 | 10/2017 | Pusch et al. | |
| 9,846,972 B2* | 12/2017 | Montgomerie ........ | G09B 5/125 |
| 10,070,156 B2 | 9/2018 | Horev et al. | |
| 10,102,674 B2 | 10/2018 | Nartker et al. | |
| 10,108,256 B2 | 10/2018 | Shiu et al. | |
| 10,498,790 B2 | 12/2019 | duBreuil | |
| 2011/0246616 A1 | 10/2011 | Ronca et al. | |
| 2012/0293610 A1* | 11/2012 | Doepke ............. | H04N 5/23238 |
| | | | 348/36 |
| 2012/0294549 A1* | 11/2012 | Doepke ................ | G06T 3/4038 |
| | | | 382/294 |
| 2013/0215281 A1 | 8/2013 | Hobby et al. | |
| 2014/0364228 A1 | 12/2014 | Rimon | |
| 2015/0015738 A1* | 1/2015 | Kuwada ............. | H04N 5/23296 |
| | | | 348/231.6 |
| 2016/0093108 A1 | 3/2016 | Xiaodong et al. | |
| 2016/0314624 A1 | 10/2016 | Li et al. | |
| 2017/0064154 A1* | 3/2017 | Tseng ........................ | H04N 5/04 |
| 2017/0150230 A1 | 5/2017 | Masaru et al. | |
| 2017/0339446 A1* | 11/2017 | Arms ................. | H04N 21/4335 |
| 2018/0014025 A1 | 1/2018 | Syed et al. | |
| 2018/0063501 A1* | 3/2018 | Chen ................ | H04N 21/41415 |
| 2018/0074679 A1* | 3/2018 | Wang ................. | G06F 3/04812 |
| 2018/0288557 A1* | 10/2018 | Najaf-Zadeh ........ | H04N 21/235 |
| 2018/0350037 A1* | 12/2018 | Matsushima ............. | G06T 3/40 |
| 2018/0369702 A1* | 12/2018 | Hake ...................... | A63G 31/02 |
| 2019/0045157 A1* | 2/2019 | Venshtain ............... | G06T 15/20 |
| 2019/0149731 A1 | 5/2019 | Blazer et al. | |
| 2020/0184600 A1* | 6/2020 | Miao ..................... | G06T 3/4038 |

FOREIGN PATENT DOCUMENTS

| | | | | |
|---|---|---|---|---|
| CN | 106331732 A | | 1/2017 | |
| CN | 106385587 A | * | 2/2017 | ......... G02B 27/0172 |
| CN | 106385587 A | | 2/2017 | |
| CN | 107635152 A | | 1/2018 | |
| CN | 107678715 A | * | 2/2018 | |
| CN | 107678715 A | | 2/2018 | |
| CN | 108107578 A | | 6/2018 | |
| EP | 2490179 A1 | | 8/2018 | |
| WO | WO-2016053906 A1 | * | 4/2016 | ............. A63F 13/42 |
| WO | WO-2017161276 A1 | * | 9/2017 | ........... A63F 13/352 |
| WO | WO-2018107781 A1 | * | 6/2018 | ........... H04N 13/332 |

OTHER PUBLICATIONS

International Search Report to corresponding International Application No. PCT/CN2019-074529 dated Apr. 12, 2019, 2 pages.
Extended European Search Report to corresponding EP Application No. 19753985.1 dated Oct. 18, 2021 (12 pages).

* cited by examiner

METHOD AND APPARATUS FOR SYNCHRONIZING VIEWING ANGLES IN VIRTUAL REALITY LIVE STREAMING

CROSS-REFERENCE TO RELATED APPLICATIONS

The present application is a national stage entry of Int'l Appl. No. PCT/CN2019/074529, filed on Feb. 2, 2019, which claims priority to the Chinese Patent Application No. 201810151922.0, filed on Feb. 14, 2018, both of which are incorporated by reference herein in their entirety.

BACKGROUND

Technical Field

The disclosure generally relates to the technical field of virtual reality live streaming, and in particular, to methods and apparatuses for synchronizing viewing angles in virtual reality live streaming.

Description of Related Art

Virtual Reality (VR) techniques use a computer to generate a simulated environment, which is comprised of real-time, dynamic, yet realistic images generated by computers. Users can view such images on screens of their mobile devices (e.g., mobile phones), or by immersing in the simulated environment with specialized head-mounted display devices, or the like. One salient difference between VR content and ordinary video content is that each VR video frame can be shot in a 360-degree panoramic manner, reproducing scenes more clearly and accurately. In a video playing process, since the screen of a playing device is usually of a planar structure and cannot display in a 360-degree panoramic manner, the playing device needs to first determine for users a viewing angle, which is utilized as the display angle for displaying each image frame. Initially, the VR content may include a default display angle. Later in the playing process, the viewer can change the viewing angle by rotating a display device or turning his or her head or rolling his or her eyeballs in the case of wearing a head-mounted display device, to view the content of each image frame of the video from more than one angle.

VR live streaming is a novel application combining VR content with live streaming technology. In VR live streaming, VR content usually includes content such as a VR video prepared in advance. A VR content transmitting device obtains the VR content in advance and then plays it synchronously to one or more VR receiving devices in real-time. There are many application scenarios for VR live streaming. For example, in an Internet-based sales system, the sale of some products (e.g., home furnishing or decoration products) requires large-scaled scenes to more clearly present and showcase specific product features. With VR technology, those products can be arranged in such scenes in advance to prepare the corresponding VR content. Subsequently, the VR content is played to shopping or purchasing users via VR live streaming, enabling the users to obtain more accurate information about specific products. In various scenarios, VR live streaming is used to transmit movie-like pure display content, game-like exploration content, or the like, to VR receiving devices.

SUMMARY

Embodiments of the disclosure provide methods and apparatuses for synchronizing viewing angles in Virtual Reality (VR) live streaming to solve the problem associated with synchronization of viewing angles in VR live streaming.

In one embodiment of the disclosure, a method for synchronizing viewing angles in VR live streaming comprises: determining transmitting user's viewing angle information corresponding to image frames in a process of playing VR content on a transmitting device side; and providing the image frames in the VR content as well as the transmitting user's viewing angle information corresponding to the image frames to a VR receiving device such that, when displaying the VR content, the VR receiving device is configured to determine, based on the transmitting user's viewing angle information corresponding to a current image frame to be displayed and a preset number of preceding image frames, a display angle for the VR receiving device to display the current image frame to be displayed.

In one embodiment of the disclosure, a method for synchronizing viewing angles in VR live streaming comprises: obtaining VR content information provided by a VR transmitting device, the VR content information including image frames and transmitting user's viewing angle information corresponding to the image frames; determining, based on the transmitting user's viewing angle information corresponding to a current image frame to be displayed and a preset number of preceding image frames, a display angle for a VR receiving device to display the current image frame to be displayed; and displaying, based on the determined display angle, the current image frame to be displayed.

In one embodiment of the disclosure, a method for synchronizing viewing angles in VR live streaming comprises: determining transmitting user's viewing angle information corresponding to image frames in the process of playing VR content on a transmitting device side; and providing the image frames in the VR content and the transmitting user's viewing angle information corresponding to the image frames to a VR receiving device such that, when displaying the VR content, the VR receiving device is configured to provide prompt information about a transmitting user's viewing angle based on a parallax between a recipient user's viewing angle and the transmitting user's viewing angle.

In one embodiment of the disclosure, a method for synchronizing viewing angles in VR live streaming comprises: obtaining VR content information provided by a VR content transmitting device, the VR content information including image frames and transmitting user's viewing angle information corresponding to the image frames; determining recipient user's viewing angle information corresponding to a current image frame to be displayed; generating prompt information about a transmitting user's viewing angle based on parallax information between the recipient user's viewing angle and the transmitting user's viewing angle corresponding to the current image frame to be displayed; and providing the prompt information when the current image frame to be displayed is being displayed.

In one embodiment of the disclosure, an apparatus for synchronizing viewing angles in VR live streaming comprises: a first transmitting user's viewing angle information determining unit, configured to determine transmitting user viewing angle information corresponding to image frames in a process of playing VR content on a transmitting device side; and a first VR content providing unit, configured to provide the image frames in the VR content and the transmitting user's viewing angle information corresponding to the image frames to a VR receiving device such that, when displaying the VR content, the VR receiving device is configured to determine, based on transmitting user's viewing angle information corresponding to a current image frame to be displayed and a preset number of preceding image frames, a display angle for the VR receiving device to display the current image frame to be displayed.

In one embodiment of the disclosure, an apparatus for synchronizing viewing angles in VR live streaming comprises: a VR content obtaining unit, configured to obtain VR content information provided by a VR transmitting device, the VR content information including image frames and transmitting user viewing angle information corresponding to the image frames; a display angle determining unit, configured to determine, based on transmitting user's viewing angle information corresponding to a current image frame to be displayed and a preset number of preceding image frames, a display angle for a VR receiving device to display the current image frame to be displayed; and a display unit, configured to display, based on the determined display angle, the current image frame to be displayed.

In one embodiment of the disclosure, an apparatus for synchronizing viewing angles in VR live streaming comprises: a second sender user viewing angle information determining unit, configured to determine transmitting user's viewing angle information corresponding to image frames in a process of playing VR content on a transmitting device side; and a second VR content providing unit, configured to provide the image frames in the VR content and the transmitting user's viewing angle information corresponding to the image frames to a VR receiving device such that, when displaying the VR content, the VR receiving device is configured to provide prompt information about a transmitting user viewing angle based on a parallax between a recipient user's viewing angle and the transmitting user's viewing angle.

In one embodiment of the disclosure, an apparatus for synchronizing viewing angles in VR live streaming comprises: a VR content obtaining unit, configured to obtain VR content information provided by a VR transmitting device, the VR content information including image frames and transmitting user viewing angle information corresponding to the image frames; a recipient user's viewing angle information determining unit, configured to determine recipient user's viewing angle information corresponding to a current image frame to be displayed; a prompt information generating unit, configured to generate prompt information about a transmitting user viewing angle based on parallax information between the recipient user's viewing angle and the transmitting user's viewing angle corresponding to the current image frame to be displayed; and a prompt information providing unit, configured to provide the prompt information when the current image frame to be displayed is being displayed.

In one embodiment of the disclosure, a method for synchronizing viewing angles in Augmented Reality (AR) live streaming comprises: determining transmitting user viewing angle information corresponding to image frames in a process of playing AR content on a transmitting device side; and providing the image frames in the AR content and the transmitting user's viewing angle information corresponding to the image frames to an AR content receiving device such that, when displaying the AR content, the AR receiving device is configured to determine, based on transmitting user's viewing angle information corresponding to a current image frame to be displayed and a preset number of preceding image frames, a display angle for the AR receiving device to display the current image frame to be displayed.

In one embodiment of the disclosure, a method for synchronizing viewing angles in Augmented Reality (AR) live streaming comprises: obtaining AR content information provided by an AR transmitting device, the AR content information including image frames and transmitting user's viewing angle information corresponding to the image frames; determining, based on transmitting user's viewing angle information corresponding to a current image frame to be displayed and a preset number of preceding image frames, a display angle for an AR content receiving device to display the current image frame to be displayed; and displaying, based on the determined display angle, the current image frame to be displayed.

In one embodiment of the disclosure, a method for synchronizing viewing angles in AR live streaming comprises: determining transmitting user's viewing angle information corresponding to image frames in a process of playing AR content on a transmitting device side; and providing the image frames in the AR content and the transmitting user's viewing angle information corresponding to the image frames to an AR content receiving device such that, when displaying the AR content, the AR receiving device provides prompt information about the transmitting user's viewing angle based on a parallax between a recipient user's viewing angle and the transmitting user's viewing angle.

In one embodiment of the disclosure, a method for synchronizing viewing angles in AR live streaming comprises: obtaining AR content information provided by an AR transmitting device, the AR content information including image frames and transmitting user's viewing angle information corresponding to the image frames; determining recipient user viewing angle information corresponding to a current image frame to be displayed; generating prompt information about a transmitting user's viewing angle based on parallax information between the recipient user's viewing angle and the transmitting user's viewing angle corresponding to the current image frame to be displayed; and providing the prompt information when the current image frame to be displayed is being displayed.

Compared with the current technology, embodiments of the disclosure provide the following advantages.

With embodiments of the disclosure, for live streaming of movie-like pure display VR content, by simultaneously transmitting image frames in the VR content and corresponding transmitting user's viewing angle information to a VR receiving device by a VR transmitting device, the transmitting user's viewing angle information is preprocessed on the VR receiving device side before the preprocessed information is used as a display angle for the receiving device to display an image frame to be displayed. As such, with changes in the display angles at which the VR receiving device displays the image frames becomes smoother, despite any sudden change in the transmitting user's viewing angle incurred on the transmitting device side. Thus, the occurrence probability of situations where a recipient user feels dizzy due to such sudden change is controlled and/or reduced.

For live streaming of game-like exploration VR content, by computing parallax information between a recipient user's viewing angle and a transmitting user's viewing angle corresponding to a current image frame to be displayed, and providing prompt information accordingly, a recipient user is prompted regarding how to perform operations such as rotating his/her VR receiving device. This way, synchronization of the viewing angle of a transmitting user and the viewing angle of the recipient user is realized such that the recipient user adjusts his/her own viewing angle based on the prompt information to view, via the VR receiving device, the same VR content as viewed by the transmitting user.

The above-described advantages are merely exemplary, and embodiments the disclosure do not necessarily require all of the advantages described above to be achieved at the same time.

BRIEF DESCRIPTION OF THE DRAWINGS

The drawings to be used in the description of the embodiments are briefly introduced below. The drawings in the following description are merely some of the embodiments of the disclosure. Those of ordinary skills in the art can obtain other drawings based on these drawings without significant efforts.

DETAILED DESCRIPTION

Figure 1:
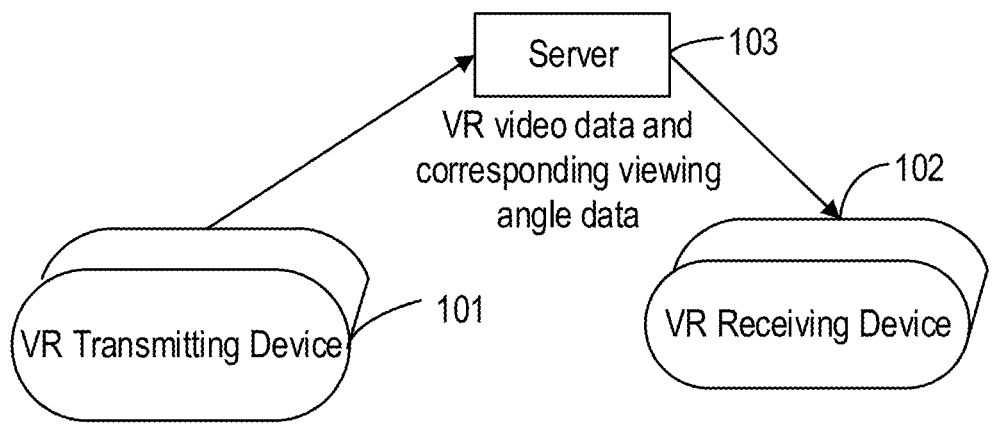
FIG. 1 is a block diagram illustrating a VR live streaming scenario according to some embodiments of the present disclosure.

The technical solutions in the embodiments of the disclosure is clearly and completely described below with reference to the drawings in the embodiments of the disclosure. The embodiments described herein are merely some, rather than all of the embodiments of the disclosure. All other embodiments obtained by those skilled in the art based on the embodiments in the disclosure without making significant efforts fall within the protection scope of the disclosure.

With the current technology, for different types of VR live streaming content, interaction modes between a transmitting device and a receiving device vary, yet similarly experiencing a problem of synchronization of viewing angles.

For instance, with content that is movie-like pure display content, usually a transmitting user selects a main viewing angle for viewing. The information sent by a transmitting device to a receiving device includes not only image data of each image frame, but also transmitting user's viewing angle information corresponding to each image frame. The receiving device is configured to determine, based on a specific image frame and the corresponding transmitting user's viewing angle, a display angle for the receiving device to display the corresponding image frame, and to play the received VR content. In other words, a recipient user passively adopts the viewing angle of the transmitting user. In this case, from the perspective of the recipient user, even if the recipient user rotates a viewing device (e.g., a mobile phone of the recipient user), or turns the head or roll eyeballs when wearing a head-mounted display device, the movement will not effectuate any change in the viewing angle for displaying the VR content. The viewing angle of the recipient user is always synchronized with that of the transmitting user, which is equivalent to that the transmitting user dictates how each recipient user views the VR content.

However, in the above-described live streaming scenario, the way that the transmitting user selects or changes the viewing angle is, nevertheless, usually to rotate a mobile device (e.g., a mobile phone), or turning the head or rolling eyeballs when wearing a head-mounted display device. During the live streaming process, the transmitting user sometimes sharply rotates the terminal device, and/or sharply turns the head, and so on. For example, in the live streaming process, the transmitting user may suddenly look up to view the content at an upper part of a panoramic image, or suddenly look down to perform some operations, and so on. Such movements cause the viewing angle at which the transmitting user views the VR content to change significantly. Correspondingly, a display angle of the VR video data played by the VR receiving device also changes because of the sudden change in the viewing angle of the transmitting user, causing dramatic image displacement. As such, the recipient user is caused to see video data that has been suddenly and/or greatly changed or even to feel dizzy because the recipient user has not orientated to the sudden image displacement.

On the other hand, for game-like exploration content, a transmitting user also selects or changes his/her viewing angle. However, with the current technology, viewing angle information of the transmitting user is not provided to a receiving device. In addition, a recipient user may change his/her viewing angle by rotating a device (e.g., a mobile phone) of the recipient user, or by turning the head or rolling eyeballs when wearing a head-mounted display device such that to explore in interfaces (e.g., a map) of a game scene, and so on. In other words, the recipient user can actively change his/her viewing angle. When the receiving device plays the VR content, a display angle of the VR content is determined based on the viewing angle of the recipient user. This way, it is possible that the transmitting device and various receiving devices may display the same VR content at different display angles during the same live streamlining process.

However, since the users are in live streaming interaction of the same activity (e.g., participating in a same game), in some situations, the recipient user needs to know the viewing angle of the transmitting user to better perform game interactions, or the like. With the current technology, the transmitting user informs the recipient user of a direction of the viewing angle of the transmitting user via voice and other mechanisms. In turn, the recipient user finds the direction of the viewing angle of the transmitting user based on the voice prompt of the transmitting user. However, for VR content such as large-scaled game scenes, the area of an image frame is very large. On the one hand, the transmitting user is not able to clearly describe his/her viewing angle's direction verbally. On the other hand, even if the transmitting user has made a clear description, it is still difficult for the recipient user to find the direction of the viewing angle associated with the transmitting party due to the excessive amount of content on the screen, and so on. Therefore, in such situations, the method provided in the current technology becomes inapplicable, as a result of which recipient users in the same game often fail to confirm or identify the direction of the main viewing angle of the transmitting user.

Based on the above-described two scenarios, embodiments of the disclosure provide an improved solution. According to various embodiments of the disclosure, in both live streaming of movie-like pure display content and live streaming of game-like exploration content, a transmitting device for live streaming is configured to provide image data of image frames and corresponding viewing angle information of a transmitting user to a receiving device. Afterward, for live streaming of different types of VR content, the receiving device is configured to perform different processing.

First, for live streaming of movie-like pure display content, at the VR receiving device side, the VR receiving device does not display frames directly based on the transmitting user's viewing angles associated with the frame data. Rather, the displaying device is configured to first perform a processing operation (e.g., an averaging operation), based on the current frame to be displayed and the viewing angle information corresponding to several image frames prior to the current image frame. Then, the result of the processed viewing angle information is determined as a display angle for displaying the current image frame at the receiving device to smooth the display angles of the image frames. Subsequently, on the VR receiving device side, the VR video data is displayed, based on the smoothed display angle information, the VR video data to a user viewing the live streaming. This way, a sudden direction change is buffered when the user views the live streaming, reducing the incidents where the user experiences the feeling of dizziness in viewing.

For live streaming of game-like exploration VR content, a VR receiving device is configured to use a viewing angle of a recipient user as a display angle of a corresponding image frame. At the same time, the VR receiving device is further configured to compute the parallax in direction information between a viewing angle of a transmitting user corresponding to each image frame, and the viewing angle of the recipient user. Based on the parallax in direction information, prompt information is provided during a process of playing the VR content by the receiving device. For example, prompt information such as an "arrow" icon can be displayed via a VR content playing interface, and/or voice-based prompt information can be generated and played, or the like.

The following illustrates exemplary embodiments of viewing angle synchronization corresponding to live streaming of different types of VR content in detail.

FIG. 1 is a block diagram illustrating a scenario of synchronizing viewing angles in VR live streaming, according to some embodiments of the disclosure. In one embodiment, viewing angle synchronization is provided for the live streaming of movie-like pure display VR content. In this application, a display angle at which a VR transmitting device displays the VR content is related to the movement of the VR transmitting device. On the other hand, a display angle at which a VR receiving device displays a current image frame to be displayed is not related to the movement of the VR receiving device. As shown herein FIG. 1, a user using a VR transmitting device 101 is a live streaming user (e.g., content producer, or hosting user), also referred to herein as a transmitting user. The transmitting user utilizes the VR transmitting device 101 (e.g., a VR head-mounted display (HMD) or a mobile device) to view VR content. The VR transmitting device 101 is configured to provide the VR content viewed by the transmitting user, and also the transmitting user's viewing angle information corresponding to specific image frames in the VR content to a VR receiving device 103. In some embodiments, the above-described information provided by the VR transmitting device 101 is forwarded to the VR receiving device 103 via a server 102. In other embodiments, such information is directly provided via a point-to-point connection from the VR transmitting device 101 to the VR receiving device 103.

In some embodiments, each frame of the VR video data sent by the VR transmitting device 101 includes 360-degree panoramic data. After receiving the VR video data and the corresponding transmitting user's viewing angle information, the VR receiving device is configured to smooth the viewing angle information. Any suitable algorithms can be used for smoothing the viewing angle information. For example, an average value of the viewing angle information corresponding to the N image frames preceding the current one is obtained and used as a display angle for the current image frame. Next, the VR receiving device is configured to display the current image frame to a recipient user based on such a display angle for the current image frame. Likewise, other image frames are to be processed similarly.

Although only one VR receiving device 103 is shown in FIG. 1, it is understood that any number of VR receiving devices may be included in various embodiments.

Compared with the current technology, the techniques provided in embodiments of the disclosure do not directly use a transmitting user's viewing angle as a display angle at the VR receiving device. Rather, transmitting the user's viewing angle information is smoothed into the display angle on the VR receiving device side to avoid incidents such as a sudden displacement or rotation of an image frame played at the receiving device caused by a sudden change in the viewing angle of the transmitting user. This way, the occurrence probability that the recipient user feels dizzy when viewing is reduced.

Figure 2:
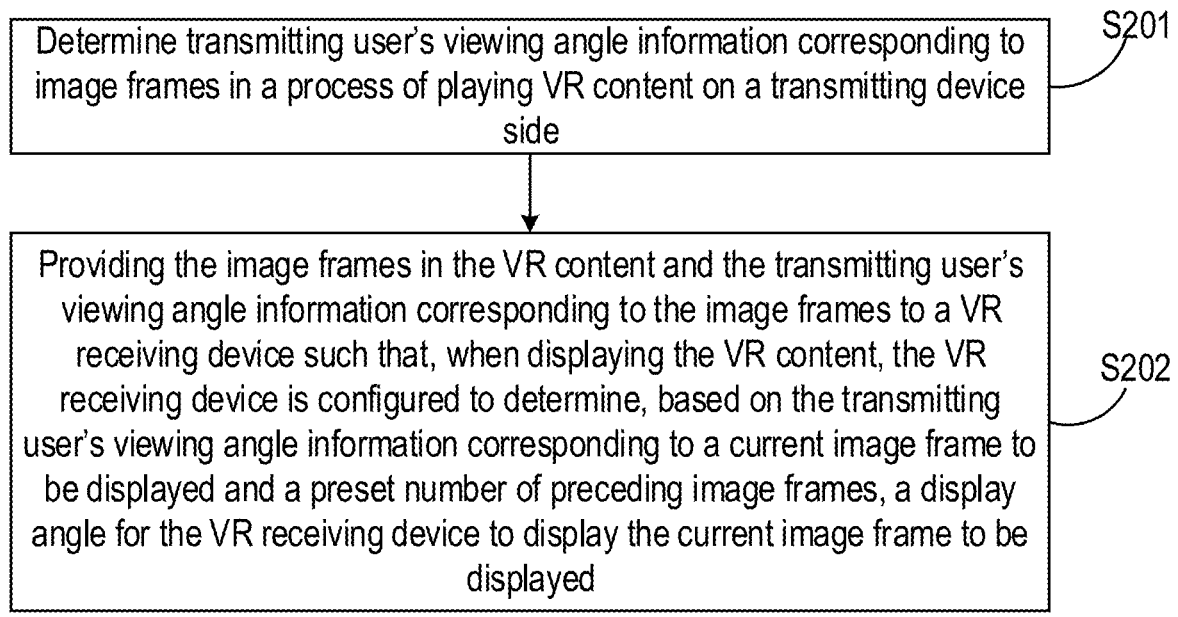
FIG. 2 is a flow diagram illustrating a method for VR live streaming according to some embodiments of the present disclosure.

FIG. 2 is a flow diagram illustrating a method for synchronizing viewing angles in VR live streaming, according to some embodiments of the disclosure. In some embodiments, the method is performed at a VR transmitting device. In one embodiment, the method includes the following steps.

Step S201: the VR transmitting device is configured to determine the transmitting user's viewing angle information corresponding to the image frames in the process of playing VR content on a transmitting device side.

In one embodiment, a transmitting user uses a VR transmitting device to view a VR video. For example, a live streaming user puts on a VR head-mounted display to view a movie or the like. In his or her viewing process, a direction of the viewing angle of the transmitting user may change at any time. For instance, a head raising motion of the transmitting user causes a sudden upward movement in the direction of the line of sight, a head lowering motion of the transmitting user causes a sudden downward movement in the direction of the line of sight, and so on. Therefore, not only the VR transmitting device needs to acquire panoramic data of each frame of the VR video, but also the viewing angle information, corresponding to each frame of the video data, when the transmitting user views the VR video. The viewing angle information is used to indicate a direction of the line of sight at which the transmitting user on the VR transmitting device side views the VR content. In one embodiment, the VR transmitting device is provided with a sensor configured to detect changes in the viewing angle information caused by the movement of the VR transmitting device. As such, when the transmitting user's viewing angle information corresponding to the image frames in the process of playing the VR content on the VR transmitting device side is to be determined, the transmitting user's viewing angle information corresponding to the image frames is determined based on the changes in the viewing angle information uploaded by the sensor.

In some embodiments, each image frame of the VR content corresponds to its respective transmitting user's viewing angle information. As such, to determine the transmitting user's viewing angle information corresponding to image frames is to determine a corresponding transmitting user's viewing angle for each image frame, respectively. In other embodiments, the transmitting user's viewing angle information is provided once every certain number of frames, or the like.

Step S202: the transmitting device is configured to provide the image frames in the VR content and the transmitting user's viewing angle information corresponding to the image frames to a VR receiving device such that, when displaying the VR content, the VR receiving device is configured to determine, based on the transmitting user's viewing angle information corresponding to a current image frame to be displayed and a preset number of preceding image frames, a display angle for the VR receiving device to display the current image frame to be displayed.

In some embodiments, the VR transmitting device is configured to provide the image frames in the VR content and the corresponding transmitting user's viewing angle information to the VR receiving device via technologies such as remote data synchronization. In various embodiments, the image frames and the corresponding transmitting user's viewing angle information is forwarded to the VR receiving device via a server, directly sent to the VR receiving device via a point to point connection or the like. In one example, the image frames in the VR content and the corresponding transmitting user's viewing angle information is sent in the units of frames. In other examples, several image frames are synchronized to the VR receiving device as a video stream, and the transmitting user's viewing angle information corresponding to the image frames in the VR content is provided in the video stream. Regardless of which transmitting mode is adopted, the VR transmitting device and the VR receiving device need to be in agreement such that the VR receiving device can correspond each image frame to a respective transmitting user's viewing angle.

After receiving the VR content, the VR receiving device is configured to extract, from the VR content, image frames, and corresponding transmitting user's viewing angle information. In one example, a display angle associated with a current image frame for displaying at the VR receiving device is related to the transmitting user's viewing angles corresponding to all of a preset number (e.g., 5) of preceding image frames in the VR content. Thus, the VR receiving device is configured to save the transmitting user's viewing angles corresponding to at least the preset number of received image frames. In one embodiment, based on the preset number of frames, a series of transmitting user's viewing angle information, such as ( . . . , $x_{n-1}$, $x_n$, $x_{n+1}$, $x_{n+2}$, . . . ), is saved based on a preset number. Here, $x_n$ is a vector representing the transmitting user's viewing angle information corresponding to the nth image frame. In some embodiments, when the preset number is known, the size of a sliding window is configured the same as the preset number. Each time the transmitting user's viewing angle information corresponding to a new image frame is received, a vector of the transmitting user's viewing angle information corresponding to the new image frame is added to the above-described series, and the sliding window moves forward by one window unit.

According to various embodiments, any suitable techniques can be used to process the received transmitting user's viewing angle information, as long as smooth transitions are achieved in terms of changes in viewing angles. For example, in one implementation, based on a playing order of frames in the VR content, the current image frame to be displayed and the preset number of adjacent image frames prior to the current image frame are determined. Next, an average value of the transmitting user's viewing angle information corresponding to the current image frame to be displayed, and the preset number of preceding image frames is computed and determined as the display angle for the VR receiving device to display the current image frame to be displayed. For example, with the size of the sliding window being preset as m+1, the current image frame to be displayed is related to the transmitting user's viewing angle information corresponding to m number of adjacent image frames prior to the current image frame, where m may be an integer greater than 1. Here, to compute the display angle for the current image frame to be displayed, the following formula is used: $Y_n = X_{n-m} + X_{n-m+1} + \ldots X_{n/(m+1)}$. That is, a display angle ($Y_n$) of the nth image frame for displaying at the VR receiving device is an average value of the transmitting user's viewing angles corresponding to the nth image frame and the m number of image frames prior to the nth image frame.

According to various embodiments, the larger the value of m is, the more stable the computed changes of the display angle are, which translates into a smoother curve of changes for the display angles associated with the image frames for displaying at the VR receiving device.

After a smoothing operation is performed on the viewing angle information, the resulting viewing angle is used as the display angle for displaying at the VR receiving device. As such, the current image frame to be displayed is displayed based on the display angle, and other frames are processed similarly.

According to various embodiments of the disclosure, by smoothing viewing angles, changes in display angles of the image frames at the VR receiving side are rendered more stable in a display process. This way, the probability of occurrence for incidents such as the recipient user feeling dizzy due to a sudden change in a transmitting user's viewing angle. However, the smoothing process may cause a viewing angle at which the recipient user views the VR content to be not completely consistent with the viewing angle of the transmitting user, as well as situations such as delay occurring. Further, if the transmitting user's viewing angle does not change suddenly, smoothing each image frame before displaying wastes computing resources and the like to some extent. Moreover, this also causes a delay in terms of a recipient user viewing the content, making the process unworthwhile.

In view of this, in some embodiments of the disclosure, before the viewing angle information corresponding to the current image to be displayed is smoothed, it is determined first whether the transmitting user's viewing angle of the current image to be displayed changes suddenly relative to the view angles of several previous image frames. When there is a sudden change, the above-described smoothing operation is performed. Otherwise, the image frame to be displayed is displayed based on the transmitting user's viewing angle corresponding to the current image frame to be displayed, the transmitting user's viewing angle being set directly as the display angle for displaying at the receiving device. In one embodiment, a degree of changes in the transmitting user's viewing angle information corresponding to the current image frame to be displayed relative to the transmitting user's viewing angle information corresponding to the preset number of adjacent image frames prior to the current image frame is be determined. If the degree of changes reaches a preset threshold, the step of computing an average value of the transmitting user's viewing angle information corresponding to the current image frame to be displayed and the preset number of preceding image frames is triggered. Otherwise, if the degree of changes does not reach the preset threshold, the transmitting user's viewing angle corresponding to the current image frame is determined as the display angle for the VR receiving device to display the current image frame to be displayed. In one example, since a transmitting user's viewing angle associated with each image frame corresponds to a vector, the magnitude of the degree of changes is determined by computing the distance between vectors and determining the length of such distance. That is, the preset threshold corresponding to the degree of changes is configured as a length value representing the distance between one vector and another vector, or the like This way, via the above-described method, a smoothing operation is performed on an as-needed basis. That is, when a smoothing operation is needed (e.g., when it is found that there is a sudden change in the transmitting user's viewing angle), processing such as computing an average value is performed. As such, the usage of computing resources is reduced, with the consistency between the viewing angle at which the recipient user views the VR content, and the transmitting user's viewing angle is guaranteed to a great extent.

According to various embodiments of the disclosure, image frames in VR content and corresponding viewing angle information are simultaneously sent to a VR receiving device by a VR transmitting device. This way, after being preprocessed on the VR receiving device side, the transmitting user's viewing angle information is used as a display angle for the receiving device to display an image frame to be displayed. As a result, changes of display angles at which the VR receiving device displays the image frames become more smoothed such that, when the transmitting user's viewing angle changes suddenly on the transmitting device side, the occurrence probability of incidents such as a recipient user feeling dizzy due to the sudden change is controlled and/or reduced.

Figure 3:
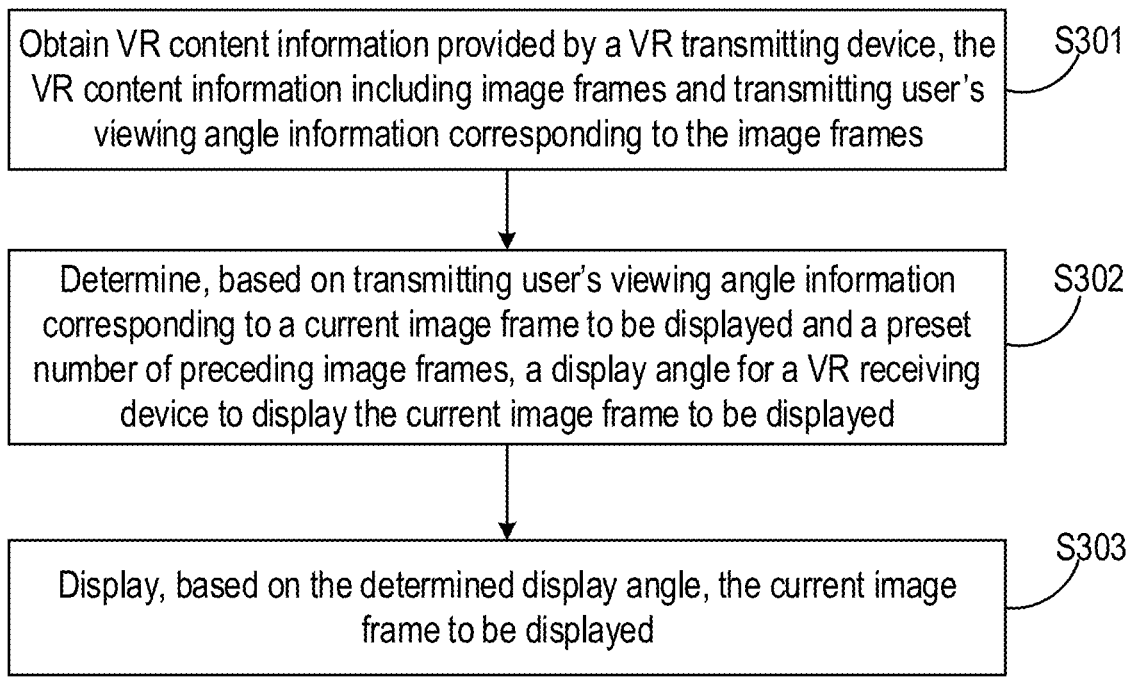
FIG. 3 is a flow diagram illustrating a method for VR live streaming according to some embodiments of the present disclosure.

FIG. 3 is a flow diagram illustrating a method for synchronizing viewing angles in VR live streaming, according to some embodiments of the disclosure. In some embodiments, the method is performed by a VR content receiving device. In one embodiment, the method includes the following steps.

Step S301: a VR content receiving device is configured to obtain VR content information provided by a VR content transmitting device, the VR content information including image frames and transmitting user's viewing angle information corresponding to the image frames.

Step S302: the VR content receiving device is configured to determine, based on the transmitting user's viewing angle information corresponding to a current image frame to be displayed and a preset number of preceding image frames, a display angle at which a VR receiving device displays the current image frame to be displayed.

In one example, to determine the display angle at which the VR receiving device displays the current image frame to be displayed, an average value of the transmitting user's viewing angle information corresponding to the current image frame to be displayed and the preset number of image frames prior to the current image frame is computed, and determined as the display angle at which the VR receiving device displays the current image frame to be displayed.

Further, before the average value is computed, a degree of changes in the transmitting user's viewing angle information corresponding to the current image frame to be displayed relative to the transmitting user's viewing angle information corresponding to the preset number of preceding adjacent image frames is determined first. If the degree of changes reaches a preset threshold, the step of computing an average value of the transmitting user's viewing angle information corresponding to the current image frame to be displayed and the preset number of image frames prior to the current image frame is triggered. If the degree of changes does not reach the preset threshold, the transmitting user's viewing angle corresponding to the current image frame is determined as the display angle at which the VR receiving device displays the current image frame to be displayed.

Step S303: the VR content receiving device is configured to display, based on the determined display angle, the current image frame to be displayed.

In this example, the display angle at which the VR receiving device displays the current image frame to be displayed is not related to the movement of the VR receiving device.

For purposes of simplicity, details with regard to FIG. 3 that are substantially similar to those described with regard to FIG. 2 are not repeated.

Figure 4:
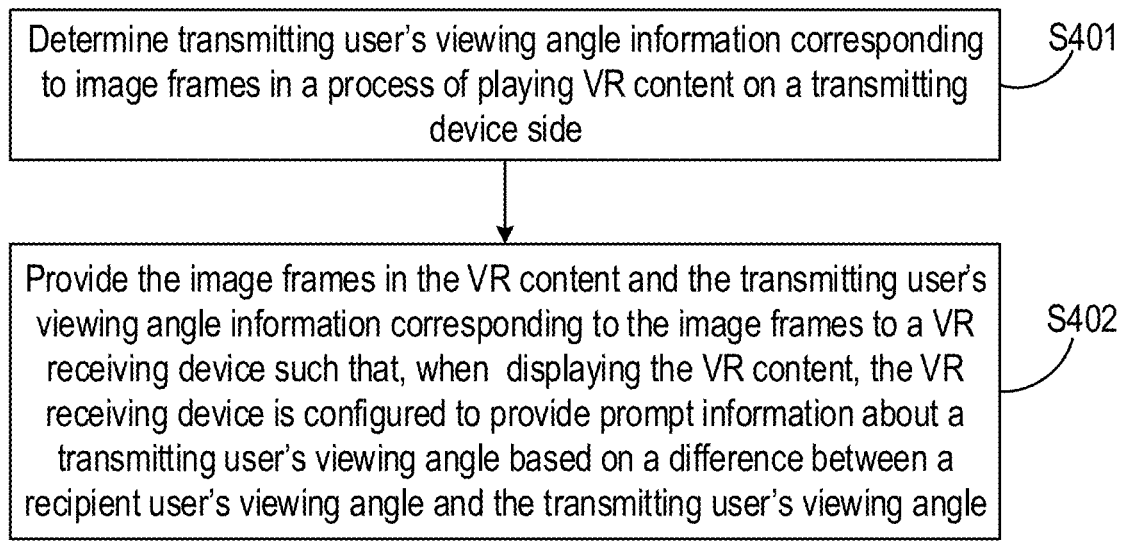
FIG. 4 is a flow diagram illustrating a method for VR live streaming according to some embodiments of the present disclosure.

FIG. 4 is a flow diagram illustrating a method for synchronization of viewing angles in VR live streaming, according to some embodiments of the disclosure. In some embodiments, the method for synchronization of viewing angles is provided in live streaming game-like exploration VR content. In this scenario, a display angle at which a VR transmitting device displays the VR content is related to the movement of the VR transmitting device, and a display angle at which the VR receiving device displays the VR content is related to the movement of the VR receiving device. In some embodiments, the method is performed at a VR content transmitting device. In one embodiment, the method for synchronizing viewing angles in VR live streaming includes the following steps.

Step S401: a VR content transmitting device is configured to determine transmitting user's viewing angle information corresponding to image frames in a process of playing VR content on a transmitting device side.

In some embodiments, step S401 is substantially the same as step S201 above-described with connection to FIG. 2. That is, although a VR content receiving device displays the VR content at a display angle, which changes based on a recipient user viewing angle, the transmitting user's viewing angle information on the transmitting device side is still provided to the VR receiving device. Based on the received transmitting use" view angel information, the VR receiving device is configured to provide prompt information about a transmitting user's viewing angle direction to a recipient user.

Step S402: the VR content transmitting device is configured to provide the image frames in the VR content, and the transmitting user's viewing angle information corresponding to the image frames to a VR receiving device such that, when displaying the VR content, the VR receiving device is configured to provide prompt information about a transmitting user's viewing angle based on a parallax between a recipient user's viewing angle and the transmitting user's viewing angle.

When the VR content is provided to the VR receiving device, similarly, not only are image frames in the VR content provided, but the transmitting user's viewing angle information corresponding to the image frames is also provided. For the VR receiving device, a display angle of an image frame at the VR receiving device is determined based on the recipient user's viewing angle. For example, in a game scene, the transmitting user has entered an upper right part of the scene, and the recipient user is still in a lower left part of the scene. In this case, the VR receiving device will not play the current image frame based on a display angle for the upper right part of the frame for the scene, instead will play the current image frame based a display angle for the lower left part of the frame for the scene where the recipient user is located.

However, in some embodiments, since the VR receiving device is configured to obtain the transmitting user's viewing angle information, the parallax between the recipient user's viewing angle, and the transmitting user's viewing angle is computed, based on which prompt information is provided to the recipient user to help the recipient user find the direction of the transmitting user's viewing angle by, for example, rotating the VR receiving device by himself/herself, and the like. The parallax is an angle value between the direction of the transmitting user's viewing angle and the direction of the recipient user's viewing angle, which is represented by a vector, or the like.

After the parallax between the recipient user's viewing angle and the transmitting user's viewing angle is computed, prompt information is generated based on the parallax to notify the recipient user about how to rotate the VR receiving device to find the position corresponding to the transmitting user viewing angle.

In one embodiment, the prompt information is generated in any suitable manner. In some examples, visualized directional indication information is generated based on the parallax information such that, when the prompt information is provided to the recipient user, the visualized directional indication information is superimposed on the image frame when the current image frame to be displayed is displayed. For instance, the visualized directional indication information is implemented using an arrow icon, which indicates a degree of distortion to prompt the recipient user about how to rotate his/her VR receiving device. The greater the parallax between the recipient user's viewing angle, and the transmitting user's viewing angle is, the more obviously distorted the arrow is. Further, in implementations, user identification information such as the name of the transmitting user is displayed at the visualized information (e.g., an arrow).

In some embodiments, in addition to providing the prompt information via visualized information, a prompt is provided by voice information or the like. For example, audio prompt information is generated based on the parallax information, and then played when the current image frame to be displayed is being displayed. In implementations, a text template and a voice playing model is provided in advance. After the parallax information is computed, a corresponding text is generated based on the template and converted into a voice for playing via the voice playing model, and the like. In one example, if it is found by computation that the transmitting user's viewing angle is located at the right rear position to the current recipient user's viewing angle, the text of "If you need to find the transmitting user's viewing angle, please rotate the mobile phone or head-mounted display to the right rear" is generated.

With the above-described prompt information being provided, if it is necessary to synchronize with the transmitting user's viewing angle, the recipient user accordingly adjusts his/her viewing angle based on the prompt information by, for example, rotating his/her VR receiving device, and the like. Thus, the recipient user's viewing angle is consistent with the transmitting user's viewing angle realizing synchronization with the transmitting user's viewing angle.

In other words, if the recipient user adjusts, after obtaining the prompt information, his/her viewing angle direction based on the prompt information, the VR receiving device is configured to display the VR content to the recipient user based on the viewing angle direction adjusted by the recipient user. Using the above-described example, if the line of sight of the recipient user also enters the upper right part of the scene, the VR image at the upper right part of the frame associated with the scene needs to be played on the VR receiving device based on the display angle corresponding to the upper right part of the scene. As such, the recipient user is enabled to see this part of the image.

According to embodiments of the disclosure, via computing the parallax information between a recipient user's viewing angle and a transmitting user's viewing angle corresponding to a current image frame to be displayed, prompt information is generated based on the parallax information. The prompt information is configured to prompt a recipient user regarding how to perform operations (e.g., rotating his/her VR receiving device) to realize synchronization with the viewing angle of the transmitting user. This way, the recipient user is enabled to adjust his/her own viewing angle based on the prompt information to view at the VR receiving device the same VR content as viewed by the transmitting user.

In some embodiments, in the case of a plurality of VR content receiving devices, the parallax information between the respective VR content receiving devices is determined based to the above-described method to provide prompt information about the user's viewing angles corresponding to the other VR content receiving devices. For example, if a direction of the viewing angle of a recipient user A corresponding to a VR receiving device A is different from a direction of the viewing angle of a recipient user B corresponding to a VR receiving device B, the viewing angle information of user B is prompted on a display screen of the VR receiving device A to help user A to find the position associated with the viewing angle of user B, and so on.

Figure 5:
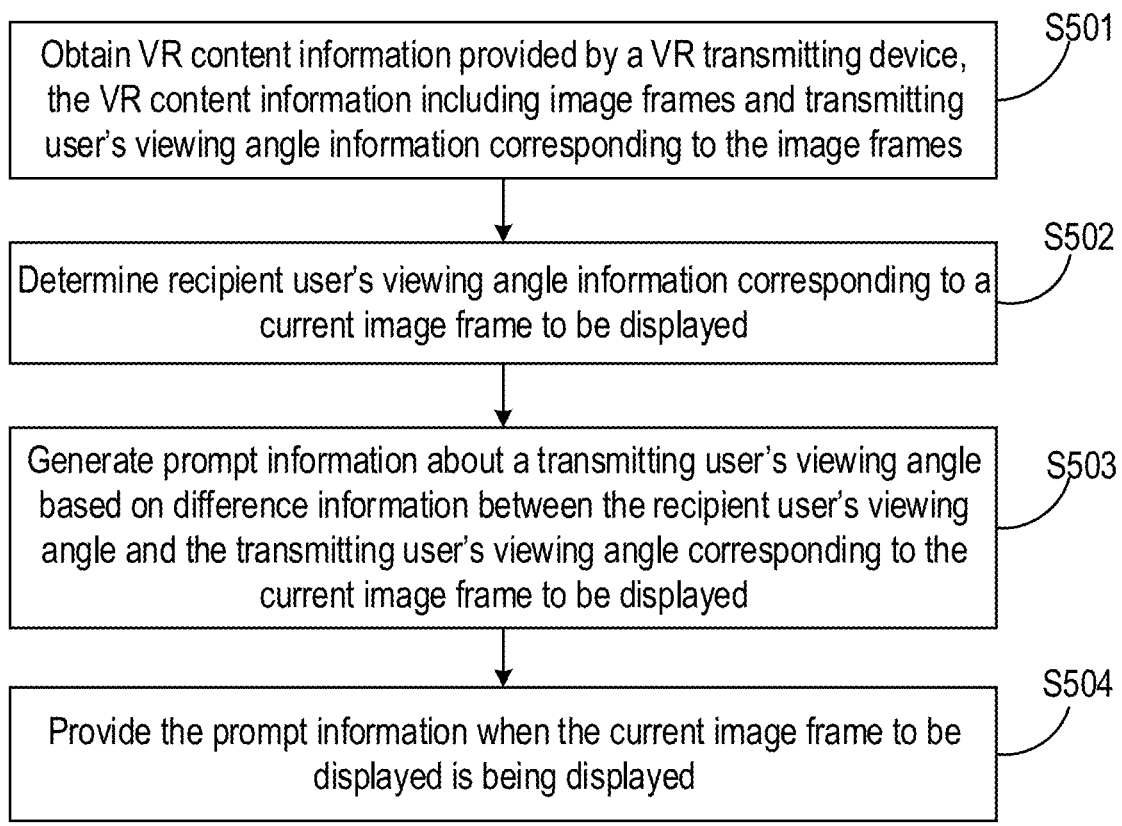
FIG. 5 is a flow diagram illustrating a method for VR live streaming according to some embodiments of the present disclosure.

FIG. 5 is a flow diagram illustrating a method for synchronization of viewing angles in VR live streaming, according to some embodiments of the disclosure. In some embodiments, the method is performed at a VR content receiving device configured to receive VR content transmitted via the method described in connection to FIG. 4. In one embodiment, the method for synchronizing viewing angles in VR live streaming includes the following steps.

Step S501: a VR content receiving device is configured to obtain VR content information provided by a VR transmitting device, the VR content information including image frames and transmitting user's viewing angle information corresponding to the image frames.

Step S502: the VR content receiving device is configured to determine the recipient user's viewing angle information corresponding to a current image frame to be displayed.

Step S503: the VR content receiving device is configured to generate prompt information about a transmitting user's viewing angle based on the parallax information between the recipient user's viewing angle and the transmitting user's viewing angle corresponding to the current image frame to be displayed.

Step S504: the VR content receiving device is configured to provide prompt information when the current image frame to be displayed is displayed.

In some embodiments, a display angle at which the VR transmitting device displays the VR content is related to the movement of the VR transmitting device, while a display angle at which the VR receiving device displays the VR content is related to the movement of the VR receiving device.

In one embodiment, to generate the prompt information about the transmitting user's viewing angle, visualized directional indication information is generated based on the above-described parallax information. In one example, the visualized directional indication information is superimposed on the image frame when the current image frame to be displayed is displayed. In another example, user identification information of the transmitting user is added into the visualized information.

In other embodiments, the prompt information about the transmitting user's viewing angle is generated by generating audio prompt information based on the parallax information. In one example, the audio prompt information is played when displaying the current image frame to be displayed.

For the purpose of simplicity, details not described with connection to FIG. 5 are substantially similar to those above-described in connection with FIGS. 2 through 4 and not repeated here.

To describe the foregoing methods provided in embodiments of the disclosure in a concise manner, all the methods have been described as a combination of a series of actions. However, those skilled in the art should know that the disclosure is not limited by the order of the described actions, as certain actions may be applied in a different order or may be performed simultaneously according to the disclosure. Further, those skilled in the art should know that, for the embodiments described herein, the actions and modules are not necessarily needed for implementing the disclosure.

Figure 6:
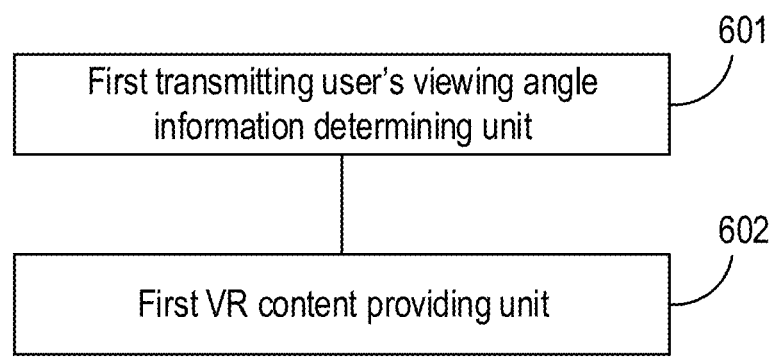
FIG. 6 is a block diagram illustrating an apparatus for VR live streaming according to some embodiments of the present disclosure.

FIG. 6 is a block diagram illustrating an apparatus for synchronizing viewing angles in VR live streaming, according to some embodiments of the disclosure. As shown in FIG. 6, the apparatus includes a first transmitting user's viewing angle information determining unit (601) and a first VR content providing unit (602).

The first transmitting user's viewing angle information determining unit (601) is configured to determine the transmitting user's viewing angle information corresponding to image frames in a process of playing VR content on a transmitting device side.

The first VR content providing unit (602) is configured to provide the image frames in the VR content, and the transmitting user's viewing angle information corresponding to the image frames to a VR receiving device such that, when displaying the VR content, the VR receiving device is configured to determine, based on the transmitting user's viewing angle information corresponding to a current image frame to be displayed and a preset number of preceding image frames, a display angle at which the VR receiving device displays the current image frame to be displayed.

In some embodiments, a display angle at which the VR transmitting device displays the VR content is related to the movement of the VR transmitting device. The display angle at which the VR receiving device displays the current image frame to be displayed is not related to the movement of the VR receiving device.

In some embodiments, the VR transmitting device is configured with a sensor to detect viewing angle change information caused by the movement of the VR transmitting device. In one example, the first transmitting user's viewing angle information determining unit (601) is further configured to determine, based on the changes in the viewing angle information uploaded by the sensor, the transmitting user's viewing angle information corresponding to the image frames.

Figure 7:
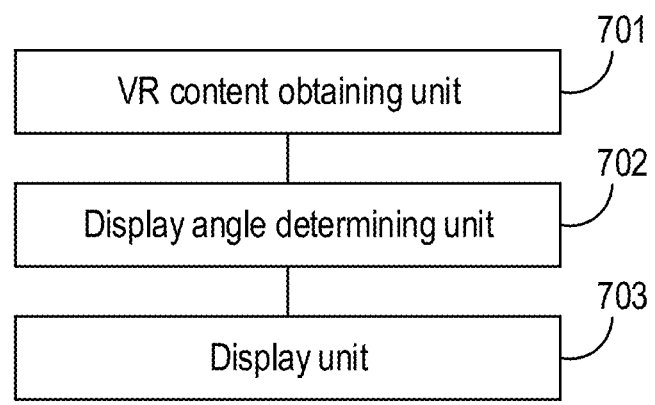
FIG. 7 is a block diagram illustrating an apparatus for VR live streaming according to some embodiments of the present disclosure.

FIG. 7 is a block diagram illustrating an apparatus for synchronizing viewing angles in VR live streaming, according to some embodiments of the disclosure. As shown in FIG. 7, the apparatus includes: a VR content obtaining unit (701), a display angle determining unit (702), and a display unit (703).

The VR content obtaining unit (701) is configured to obtain VR content information provided by a VR transmitting device, the VR content information including image frames, and transmitting user's viewing angle information corresponding to the image frames.

The display angle determining unit (702) is configured to determine, based on the transmitting user viewing angle information corresponding to a current image frame to be displayed and a preset number of preceding image frames, a display angle at which a VR receiving device displays the current image frame to be displayed.

The display unit (703) is configured to display, based on the determined display angle, the current image frame to be displayed.

In one embodiment, the display angle determining unit (702) includes a computation subunit, and a display angle determining subunit. The computation subunit is configured to compute an average value of the transmitting user's viewing angle information corresponding to the current image frame to be displayed and the preset number of preceding image frames. The display angle determining subunit is configured to determine the average value as the display angle at which the VR receiving device displays the current image frame to be displayed.

In some embodiments, the apparatus further includes a degree of changes in viewing angle determining unit, a trigger unit, and a direct determining unit. The degree of changes in viewing angle determining unit is configured to determine a degree of change information of the transmitting user's viewing angle information corresponding to the current image frame to be displayed relative to the transmitting user's viewing angle information corresponding to the preset number of preceding adjacent image frames. The trigger unit is configured to if the degree of change information reaches a preset threshold, trigger the step of computing an average value of the transmitting user's viewing angle information corresponding to the current image frame to be displayed and the preset number of preceding image frames. The direct determining unit is configured to: if the degree of change information does not reach the preset threshold, determine the transmitting user's viewing angle corresponding to the current image frame as the display angle for the VR receiving device to display the current image frame to be displayed.

In some embodiments, the display angle at which the VR receiving device displays the current image frame to be displayed is not related to the movement of the VR receiving device caused by a recipient user.

Figure 8:
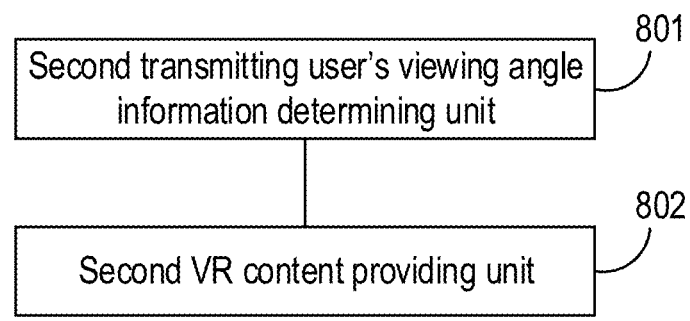
FIG. 8 is a block diagram illustrating an apparatus for VR live streaming according to some embodiments of the present disclosure.

FIG. 8 is a block diagram illustrating an apparatus for synchronizing viewing angles in VR live streaming, according to some embodiments of the disclosure. As shown in FIG. 8, the apparatus includes: a second transmitting user's viewing angle information determining unit (801), and a second VR content providing unit (802).

The second transmitting user's viewing angle information determining unit (801) is configured to determine the transmitting user's viewing angle information corresponding to image frames in a process of playing VR content on a transmitting device side.

The second VR content providing unit (802) is configured to provide the image frames in the VR content, and the transmitting user's viewing angle information corresponding to the image frames to a VR receiving device such that, when displaying the VR content, the VR receiving device is configured to provide prompt information about a transmitting user's viewing angle based on a parallax between a recipient user's viewing angle and the transmitting user's viewing angle.

In some embodiments, a display angle at which the VR transmitting device displays the VR content is related to the movement of the VR transmitting device, while a display angle at which the VR receiving device displays the VR content is related to the movement of the VR receiving device.

Figure 9:
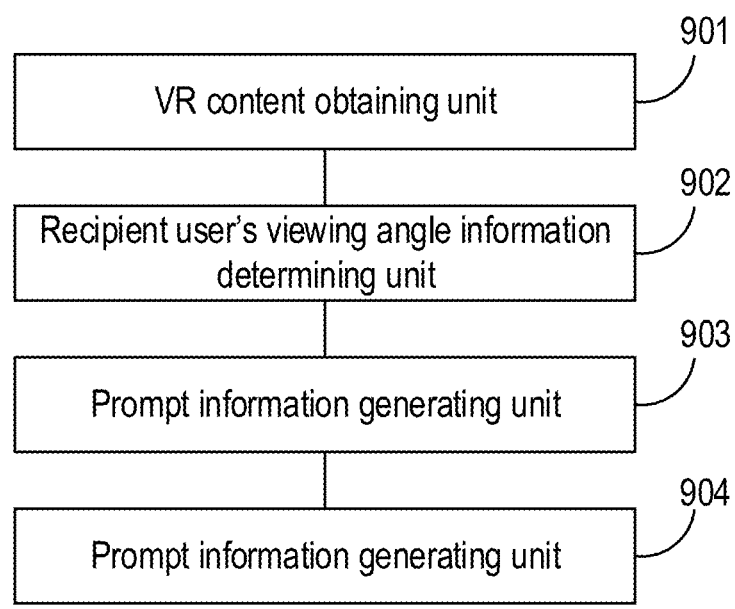
FIG. 9 is a block diagram illustrating an apparatus for VR live streaming according to some embodiments of the present disclosure.

FIG. 9 is a block diagram illustrating an apparatus for synchronizing viewing angles in VR live streaming, according to some embodiments of the disclosure. As shown in FIG. 9, the apparatus includes a VR content obtaining unit (901), a recipient user's viewing angle information determining unit (902), a prompt information generating unit (903), and prompt information providing unit (904).

The VR content obtaining unit (901) is configured to obtain VR content information provided by a VR transmitting device, the VR content information including image frames, and transmitting user viewing angle information corresponding to the image frames.

The recipient user's viewing angle information determining unit (902) is configured to determine the recipient user's viewing angle information corresponding to a current image frame to be displayed.

The prompt information generating unit (903) is configured to generate prompt information about a transmitting user's viewing angle based on the parallax information between the recipient user's viewing angle and the transmitting user's viewing angle corresponding to the current image frame to be displayed.

The prompt information providing unit (904) is configured to provide the prompt information when the current image frame to be displayed is displayed.

In some embodiments, a display angle at which the VR transmitting device displays the VR content is related to movement of the VR transmitting device. A display angle at which the VR receiving device displays the VR content is related to the movement of the VR receiving device.

In some embodiments, the prompt information generating unit (903) is further configured to generate visualized directional indication information based on the parallax information.

In one example, the prompt information providing unit (904) is further configured to superimpose, when the current image frame to be displayed is being displayed, the visualized directional indication information on the image frame for displaying.

In some embodiments, the prompt information generating unit (903) is further configured to add user identification information of the transmitting user into the visualized information.

In other embodiments, the prompt information generating unit (903) is further configured to generate audio prompt information based on the parallax information.

In one example, the prompt information providing unit (904) is further configured to play the audio prompt information when the current image frame to be displayed is being displayed.

Various embodiments of the disclosure further provide synchronization of viewing angles in live streaming of Augmented Reality (AR). The difference between AR live streaming and VR live streaming is that, in a process of AR live streaming, both a transmitting user and a recipient user are required to be able to collect images of the same entity object, and display the associated AR content based on a display position of the entity object shown in a screen. The solution provided by the embodiments of the disclosure is used in AR-based live streaming. That is, if each image frame in AR content is a 360-degree panoramic image, and a user can change a viewing angle by rotating his/her AR device, the solution provided by the embodiments of the present disclosure may also be used to synchronize the viewing angles of a transmitting user and a recipient user, avoiding the occurrence of situations such as the recipient user feeling dizzy.

In AR live streaming, there are live streaming of pure display content and live streaming of exploration content. Correspondingly, for different types of AR content, synchronization problems and corresponding processing methods are different.

In some embodiments substantially similar to the method above-described with connection to FIG. 2, a method for synchronizing viewing angles in AR live streaming is provided. The method includes the following steps.

Step 1: determining transmitting user's viewing angle information corresponding to image frames in a process of playing AR content on a transmitting device side.

Step 2: providing the image frames in the AR content and the transmitting user viewing angle information corresponding to the image frames to an AR receiving device such that, when displaying the AR content, the AR receiving device is configured to determines, based on the transmitting user viewing angle information corresponding to a current image frame to be displayed and a preset number of preceding image frames, a display angle at which the AR receiving device displays the current image frame to be displayed.

In some embodiments, substantially similar to the method above-described with connection to FIG. 3, a method for synchronizing viewing angles in AR live streaming is provided. The method includes the following steps.

Step 1: obtaining AR content information provided by an AR transmitting device, the AR content information including image frames and transmitting user viewing angle information corresponding to the image frames.

Step 2: determining, based on the transmitting user's viewing angle information corresponding to a current image frame to be displayed and a preset number of preceding image frames, a display angle at which an AR receiving device displays the current image frame to be displayed.

Step 3: displaying, based on the determined display angle, the current image frame to be displayed.

In some embodiments, substantially similar to the method above-described with connection to FIG. 4, a method for synchronizing viewing angles in AR live streaming is provided. The method includes the following steps.

Step 1: determining transmitting user's viewing angle information corresponding to image frames in a process of playing AR content on a transmitting device side.

Step 2: providing the image frames in the AR content and the transmitting user's viewing angle information corresponding to the image frames to an AR receiving device such that, when displaying the AR content, the AR receiving device is configured to provide prompt information about a transmitting user's viewing angle based on a parallax between a recipient user's viewing angle and the transmitting user's viewing angle.

In some embodiments substantially similar to the method above-described with connection to FIG. 5, a method for synchronizing viewing angles in AR live streaming is provided. The method includes the following steps.

Step 1: obtaining AR content information provided by an AR transmitting device, the AR content information including image frames and transmitting user viewing angle information corresponding to the image frames.

Step 2: determining recipient user's viewing angle information corresponding to a current image frame to be displayed.

Step 3: generating prompt information about a transmitting user's viewing angle based on parallax information between the recipient user's viewing angle and the transmitting user's viewing angle corresponding to the current image frame to be displayed.

Step 4: providing the prompt information when the current image frame to be displayed is being displayed. For the specific implementation related to AR, reference is made to the description about VR in corresponding embodiment above.

It should be noted that the embodiments in the specification are described progressively with each embodiment emphasizing a part different from other embodiments. Identical or similar parts of the embodiments may be obtained by referring to one another. Because the device embodiments are substantially similar to the method embodiments, the description for the device embodiments is relatively concise; and reference can be made to the description of the method embodiments for related parts.

Finally, it should be further noted that in this text, the relation terms such as first and second are merely used to distinguish one entity or operation from another entity or operation, and do not require or imply that the entities or operations have this actual relation or order. Moreover, the terms "include, "comprise" or other variations thereof are intended to cover non-exclusive inclusion, so that a process, a method, an article, or a device including a series of elements not only includes the elements, but also includes other elements not clearly listed, or further includes inherent elements of the process, method, article, or device. The element defined by the statement "including one," without further limitation, does not preclude the presence of additional identical elements in the process, method, commodity, or device that includes the element.

The method and apparatus for synchronizing viewing angles in VR live streaming provided by the disclosure are described in detail above. The principles and implementations of the disclosure are described by applying specific examples herein. The above descriptions on the embodiments are merely used to help understand the method of the disclosure and core ideas thereof. Meanwhile, for those skilled in the art, modifications may be made to the specific implementations and disclosure scopes according to the idea of the disclosure. To sum up, the content of the description should not be construed as any limitation to the disclosure.

The invention claimed is:

1. A method comprising:
    receiving, at a virtual reality (VR) receiving device, viewing angle information for image frames of VR content transmitted by a transmitting device;
    displaying, on the VR receiving device, the image frames;
    determining degree of change information associated with the viewing angle information corresponding to a current image frame relative to the viewing angle information corresponding to a preset number of previous image frames;
    determining, by the VR receiving device, a display angle for the current image frame in the image frames when the degree of change information reaches a preset threshold, the display angle computed based on viewing angle information corresponding to the current image frame and the preset number of previous image frames; and
    adjusting, by the VR receiving device, display of the current image frame based on the display angle.

2. The method of claim 1, the determining a display angle for a current image frame in the image frames comprising:
    computing an average value of transmitting user's viewing angle information corresponding to the current image frame and the preset number of previous image frames; and
    determining the average value as the display angle at which the VR receiving device displays the current image frame in the image frames.

3. The method of claim 1, further comprising:
    determining degree of change information associated with transmitting user's viewing angle information corresponding to the current image frame relative to transmitting user's viewing angle information corresponding to the preset number of previous image frames; and
    determining, in response to determining that the degree of change information does not reach the preset threshold, the transmitting user's viewing angle corresponding to the current image frame as the display angle at which the VR receiving device displays the current image frame.

4. The method of claim 1, wherein a display angle recorded by the VR transmitting device is associated with a movement of the VR transmitting device.

5. The method of claim 1, wherein the display angle is unrelated to a movement of the VR receiving device.

6. A non-transitory computer-readable storage medium for tangibly storing computer program instructions capable of being executed by a computer processor, the computer program instructions defining steps of:
    receiving, at a virtual reality (VR) receiving device, viewing angle information for image frames of VR content transmitted by a transmitting device;
    displaying, on the VR receiving device, the image frames;
    determining degree of change information associated with the viewing angle information corresponding to a current image frame relative to the viewing angle information corresponding to a preset number of previous image frames;
    determining, by the VR receiving device, a display angle for the current frame in the image frames when the degree of change information reaches a preset threshold, the display angle computed based on viewing angle information corresponding to a current image frame and a preset number of previous image frames; and adjusting, by the VR receiving device, display of the current image frame based on the display angle.

7. The computer-readable storage medium of claim 6, the determining a display angle for a current image frame in the image frames comprising:

computing an average value of transmitting user's viewing angle information corresponding to the current image frame and the preset number of previous image frames; and determining the average value as the display angle at which the VR receiving device displays the current image frame in the image frames.

8. The computer-readable storage medium of claim 6, the computer program instructions further defining the steps of:

determining degree of change information associated with transmitting user's viewing angle information corresponding to the current image frame relative to transmitting user's viewing angle information corresponding to the preset number of previous image frames; and determining, in response to determining that the degree of change information does not reach the preset threshold, the transmitting user's viewing angle corresponding to the current image frame as the display angle at which the VR receiving device displays the current image frame.

9. The computer-readable storage medium of claim 6, wherein a display angle recorded by the VR transmitting device is associated with a movement of the VR transmitting device.

10. The computer-readable storage medium of claim 6, wherein the display angle is unrelated to a movement of the VR receiving device.

11. An apparatus comprising:

a processor; and a storage medium for tangibly storing thereon program logic for execution by the processor, the stored program logic comprising:

logic, executed by the processor, for receiving viewing angle information for image frames of VR content transmitted by a transmitting device;

logic, executed by the processor, for displaying the image frames;

logic, executed by the processor, for determining degree of change information associated with the viewing angle information corresponding to a current image frame relative to the viewing angle information corresponding to a preset number of previous image frames;

logic, executed by the processor, for determining a display angle for the current frame in the image frames when the degree of change information reaches a preset threshold, the display angle computed based on viewing angle information corresponding to a current image frame and a preset number of previous image frames; and logic, executed by the processor, for adjusting display of the current image frame based on the display angle.

12. The apparatus of claim 11, the logic for determining a display angle for a current image frame in the image frames comprising:

logic, executed by the processor, for computing an average value of transmitting user's viewing angle information corresponding to the current image frame and the preset number of previous image frames; and logic, executed by the processor, for determining the average value as the display angle at which the VR receiving device displays the current image frame in the image frames.

13. The apparatus of claim 11, the stored program logic further comprising:

logic, executed by the processor, for determining degree of change information associated with transmitting user's viewing angle information corresponding to the current image frame relative to transmitting user's viewing angle information corresponding to the preset number of previous image frames; and logic, executed by the processor, for determining, in response to determining that the degree of change information does not reach the preset threshold, the transmitting user's viewing angle corresponding to the current image frame as the display angle at which the VR receiving device displays the current image frame.

14. The apparatus of claim 11, wherein a display angle recorded by the VR transmitting device is associated with a movement of the VR transmitting device.

15. The apparatus of claim 11, wherein the display angle is unrelated to a movement of the VR receiving device.

* * * * *